(12) United States Patent
Fukasawa

(10) Patent No.: US 8,020,170 B2
(45) Date of Patent: Sep. 13, 2011

(54) INFORMATION PROCESSING APPARATUS, METHOD OF OPERATING IT, AND COMPUTER READABLE INFORMATION RECORDING MEDIUM

(75) Inventor: Naoki Fukasawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 826 days.

(21) Appl. No.: 12/078,969

(22) Filed: Apr. 9, 2008

(65) Prior Publication Data

US 2008/0263570 A1    Oct. 23, 2008

(30) Foreign Application Priority Data

Apr. 18, 2007   (JP) .................................. 2007-109532

(51) Int. Cl.
*G06F 3/00* (2006.01)
*G06F 3/12* (2006.01)
(52) U.S. Cl. ........................................ 719/310; 358/1.1
(58) Field of Classification Search .................. 719/310; 358/1.1
See application file for complete search history.

(56) References Cited

U.S. PATENT DOCUMENTS 6,292,211 B1 * 9/2001 Pena ........................... 348/14.08
7,325,235 B2 * 1/2008 Iida et al. ....................... 719/310

FOREIGN PATENT DOCUMENTS

| JP | 2000-225754 | 8/2000 |
| JP | 2003-271286 | 9/2003 |

OTHER PUBLICATIONS

David L. Hecht, Data Graphical User interfaces, 2001.*

* cited by examiner

*Primary Examiner* — Lechi Truong
(74) *Attorney, Agent, or Firm* — IPUSA, PLLC

(57) ABSTRACT

A display part receives an input from a user and display a message to the user, a constraint processing part processes constraints among functions of a printer based on the input which the display part has received, and generates constraint information, and a message generating part manages a plurality of terms in a form of a term list, and combines terms of the plurality of terms to generate the message to be displayed by the display part based on the constraint information generated by the constraint processing part.

8 Claims, 16 Drawing Sheets

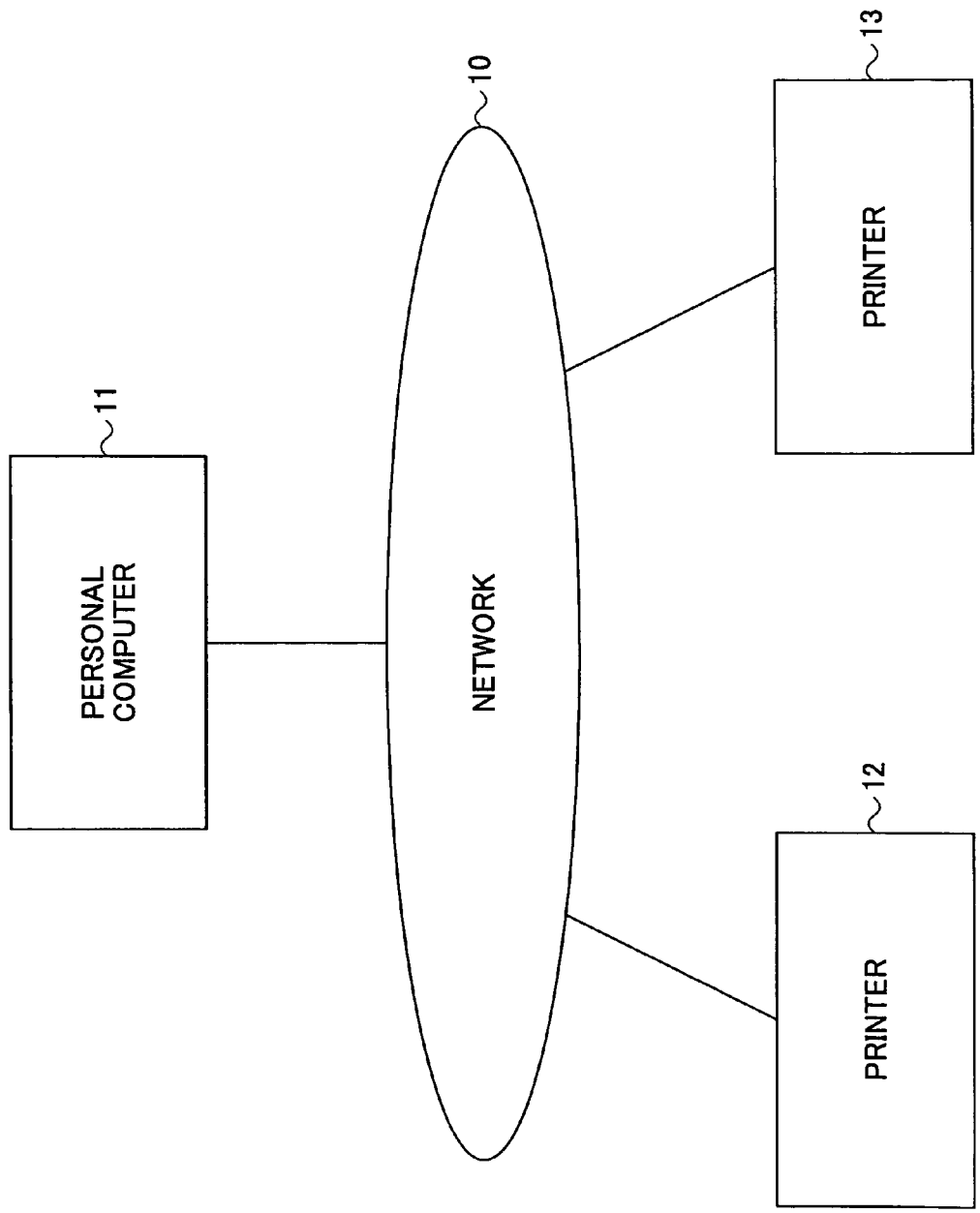

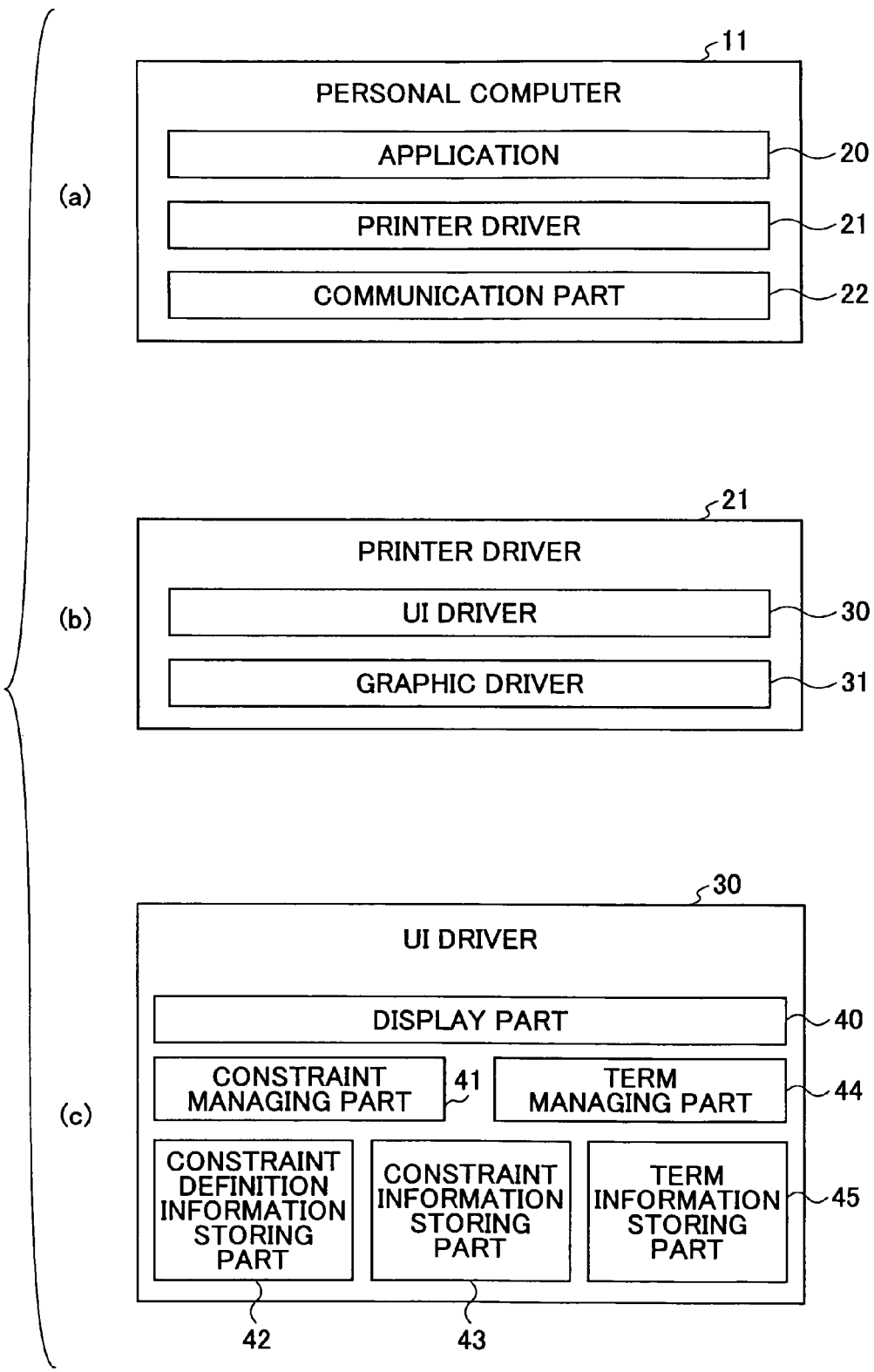

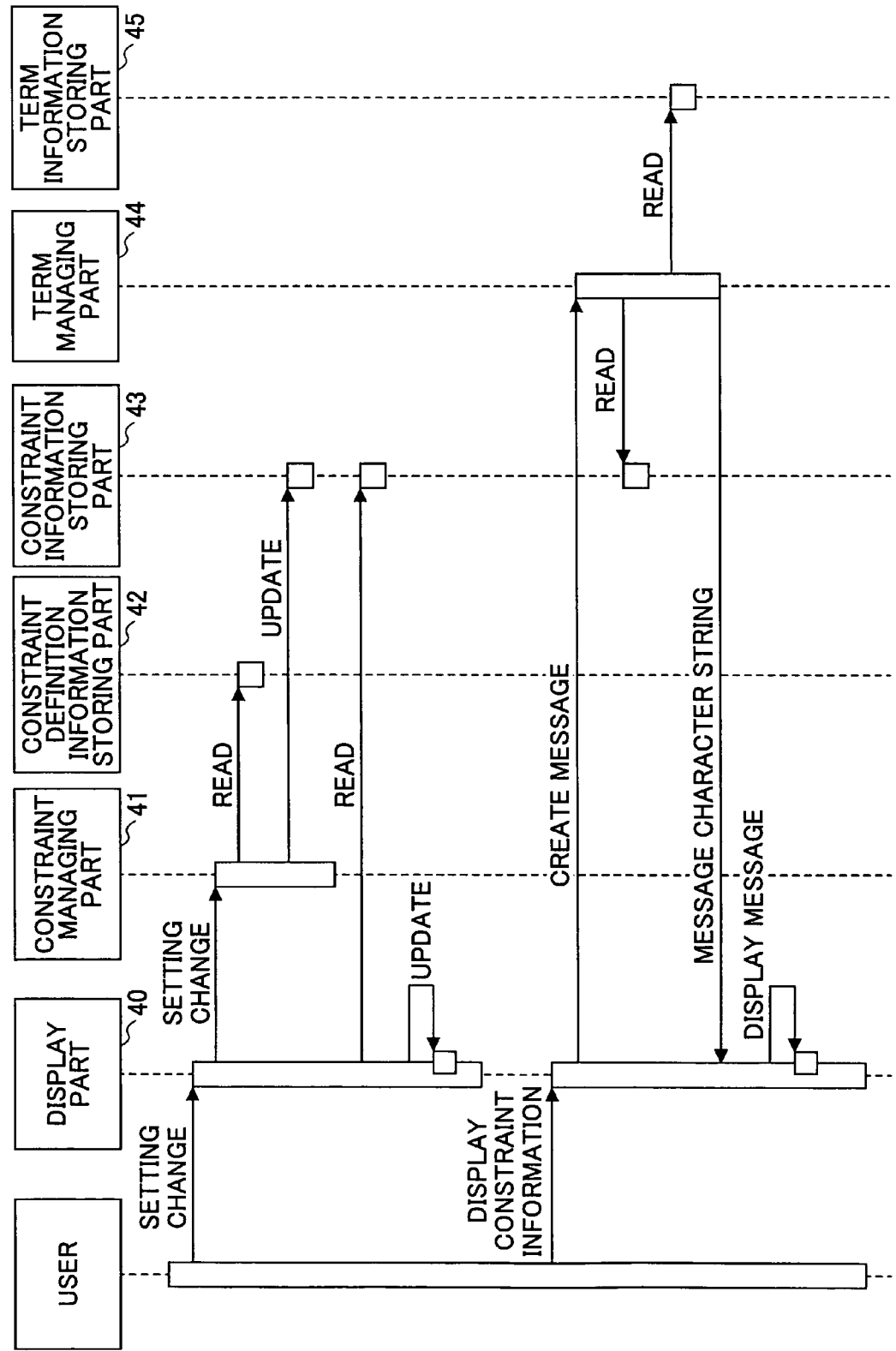

FIG.4

```
                A1          A2              A3
                  :
<function id="functionA" type="enum" default="valueA1">

<!-- DESCRIPTION OF CONSTRAINT FOR FUNCTION A -->
    <constraints>
        <constraint>
            <condition>functionB. not_equal. valueB1</condition>    ←C1 ⎫
            <condition>functionC. equal. valueC2</condition>        ←C2 ⎬ S1
        </constraint>
        <constraint>
            <condition>functionD. equal. valueD2</condition>        ←C3    S2
        </constraint>
        <constraint>
            <condition>functionE. equal. valueE2</condition>        ←C4    S3
        </constraint>
    </constraints>

<!-- OPTION FOR FUNCTION A -->

<value id="valueA1">  ←V1

<!-- DESCRIPTION OF CONSTRAINT FOR FUNCTION A1 -->
        <constraints>
            <constraint>
                <condition>functionB. equal. valueB2</condition>
                <condition>functionB. equal. valueB3</condition>
            </constraint>
            <constraint>
                <condition>functionF. more_than. 100</condition>    ←C5
            </constraint>
        </constraints>

</value>

<value id="valueA2">  ←V2

<!-- DESCRIPTION OF CONSTRAINT FOR FUNCTION A2 -->
        <constraints>
            <constraint>
                <condition>functionE. equal. valueE1</condition>
            </constraint>
        </constraints>

</value>

</function>
                  :
```

FIG.6A

```
         .
         .
         .
<texts lang="Japanese">
                                           ⟶I2
   <text id="functionA">機能A</text>    ⟵      ⟶I1
   <text id="functionA_valueA1">値A-1</text>⟵
   <text id="functionA_valueA2">値A-2</text>

<text id="functionB">機能B</text>      ⟶I5
   <text id="functionB_valueB1">値B-1</text>⟵
   <text id="functionB_valueB2">値B-2</text>
   <text id="functionB_valueB3">値B-3</text>

<text id="functionC">機能C</text>
   <text id="functionC_valueC1">値C-1</text>
   <text id="functionC_equalC2">値C-2</text>

<text id="functionD">機能D</text>
   <text id="functionD_valueD1">値D-1</text>
   <text id="functionD_valueD2">値D-2</text>

<text id="functionE">機能E</text>
   <text id="functionE_valueE1">値E-1</text>
   <text id="functionE_valueE2">値E-2</text>

<text id="functionF">機能F</text>
         .
         .
         .
                                                     ⟶I3
   <text id="constraint_current">[$item]は以下の理由で無効です。</text>⟵
   <text id="constraint_possible">[$item]は以下の場合も無効になります。</text>
   <text id="reason_equal">[$function]が[$value]である。</text>
   <text id="reason_not_equal">[$function]が[$value]でない。</text>⟵I4
   <text id="reason_more_than">[$function]が[$value]より大きい。</text>
   <text id="reason_less_than">[$function]が[$value]より小さい。</text>
         .
         .
         .
</texts>
```

[Value A] is now unavailable because

- [Function F] is more than [100].

```
.
.
<texts lang="English">

<text id="functionA">Function A</text>
  <text id="functionA_valueA1">Value A-1</text>
  <text id="functionA_valueA2">Value A-2</text>

<text id="functionB">Function B</text>
  <text id="functionB_valueB1">Value B-1</text>
  <text id="functionB_valueB2">Value B-2</text>
  <text id="functionB_valueB3">Value B-3</text>

<text id="functionC">Function C</text>
  <text id="functionC_valueC1">Value C-1</text>
  <text id="functionC_equalC2">Value C-2</text>

<text id="functionD">Function D</text>
  <text id="functionD_valueD1">Value D-1</text>
  <text id="functionD_valueD2">Value D-2</text>

<text id="functionE">Function E</text>
  <text id="functionE_valueE1">Value E-1</text>
  <text id="functionE_valueE2">Value E-2</text>

<text id="functionF">Function F</text>

.
            .

<text id="constraint_current">[$item] is now unavailable because</text>
  <text id="constraint_possible">[$item] is unavailable in following conditions</text>
  <text id="reason_equal">[$function] is [$value].</text>
  <text id="reason_not_equal">[$function] is not [$value].</text>
  <text id="reason_more_than">[$function] is more than [$value].</text>
  <text id="reason_less_than">[$function] is less than [$value].</text>

.
            .

</texts>
```

| AREA INFORMATION | TERM INFORMATION TO USE |
|---|---|
| JAPAN | JAPANESE |
| NORTH AMERICA | ENGLISH |
| ENGLAND | ENGLISH |
| OTHERS | ENGLISH |

INFORMATION PROCESSING APPARATUS, METHOD OF OPERATING IT, AND COMPUTER READABLE INFORMATION RECORDING MEDIUM

BACKGROUND OF THE INVENTION

1. Field of the Invention

The present invention relates to an information processing apparatus having a function of displaying current constraint information, a method of operating the apparatus and a computer readable information recording medium storing a program for performing the method.

2. Description of the Related Art

Generally speaking, a printer has available printing settings which are different among particular machine types. In many cases, a performance of a printer varies according to a configuration of available options mounted therein. As optional functions of a printer, there are a sorting function, a stapling function, a punching function, a booklet printing function and so forth.

Especially for printers, there are many functions which are available only exclusively, in comparison to other machines. For example, a function of right-edge stapling and a function of booklet printing are only exclusively available. In a graphical user interface (GUI) of a printer driver, generally speaking, in order to achieve exclusion among respective available capabilities or among respective available functions of a printer, very complicated constraint processing may be carried out. The constraint processing means to control so that mutually exclusive functions are prevented from being set by a user at the same time. Because the constraint processing may be complicated as mentioned above, a user may be confused as to why a particular function is not available, when the particular function which is an optional function is not available due to the constraint processing. Further, in such a case, the user may not have a specific way to solve the problem to make the particular function available, i.e., as to which other setting for example should be changed and how to carry out such a change. Therefore, a new technique has been developed for making it possible to display to a user a reason why the particular function is not available.

For example, Japanese Laid-Open Patent Application 2000-225754 discloses a method. In this method, constraint processing is described in an external file, and, in order to rationally carry out constraint processing of a user interface (UI) of a driver, the external file has two areas. In a first area, constraint processing which is common among respective machine types is descried. In a second area, constraint processing which is unique for each particular machine type is described. Then, in the file, 'constraint data' of parameters are included, and in the constraint data, a 'constraint condition list and language of messages to display' are included. In this method, constraint processing is carried out in consideration of not only combinations of designated parameters but also all or part of parameter-designating permutations. Also, in this method, constraint information is described in a setting file, and a message can be created logically. Therefore, constraint processing can be carried out flexibly to adapt to various cases, and thus, user friendliness improves.

However, in this method, actual contents of messages to display are prepared for each function as fixed contents. Thus, in each message, all the possible causes by which the function or an option of the function is subject to constraint are listed. A user cannot understand which one thereof is a true reason by which the function is currently unavailable. Further, in this method, actual contents of messages should be prepared for each machine type. Therefore, there may be a possibility that an error occurs in the contents of the messages.

SUMMARY OF THE INVENTION

In order to solve the above-mentioned problems, an information processing apparatus according to the present invention has a display part configured to receive an input from a user and display a message to the user; a constraint processing part configured to process constraints among functions of a printer based on the input which the display part has received, and to generate constraint information; and a message generating part configured to manage a plurality of terms in a form of a term list, and to combine terms of the plurality of terms to generate the message to be displayed by the display part based on the constraint information generated by the constraint processing part.

Other objects, features and advantages of the present invention will become more apparent from the following detailed description when read in conjunction with the accompanying drawings.

BRIEF DESCRIPTION OF THE DRAWINGS

FIG. 1 shows a personal computer connected to a communication network as an embodiment of the present invention;

FIG. 2 illustrates a software configuration of the personal computer;

FIG. 3 shows a sequence diagram of processing for changing a setting and processing for displaying constraint information;

FIG. 4 illustrates constraint definition information;

FIG. 6A illustrates term information described by text;

FIG. 11A shows another embodiment of a message to be displayed;

FIG. 11B shows an English translation of the message shown in FIG. 11A;

FIG. 13 illustrates term information switched for a particular area;

DETAILED DESCRIPTION OF THE PREFERRED EMBODIMENTS

Figure 5:
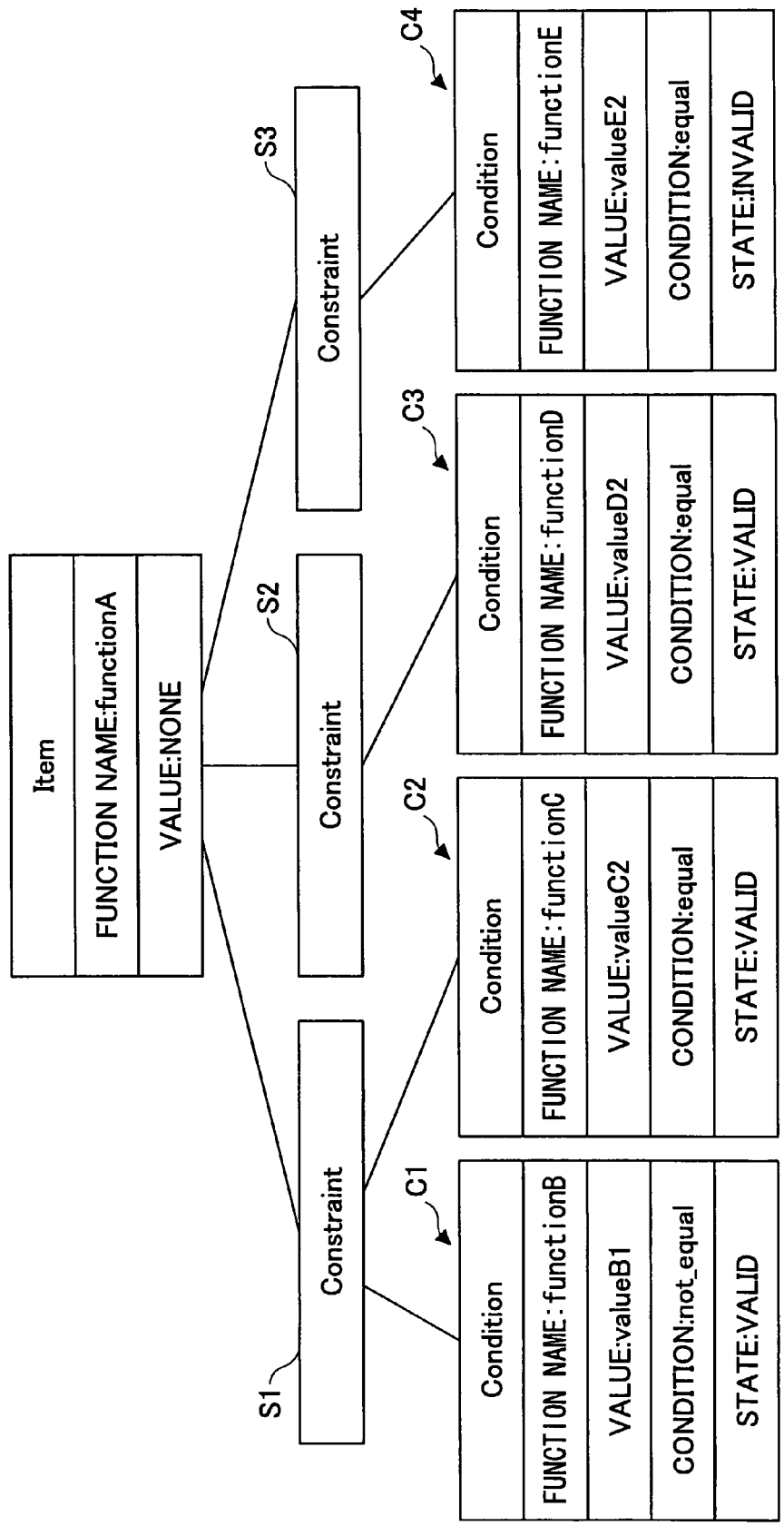
FIG. 5 illustrates constraint information.

An object of embodiments of the present invention is to provide an information processing apparatus for automatically creating a message which shows 'a reason for a function being unavailable at a time' from 'constraint information defined for each particular machine type' and a 'term list'.

In order to achieve the object, according to embodiments of the present invention, an information processing apparatus receives contents of changing a setting of a printer function as an input from a user. Then, based on the contents of changing a setting, the information processing apparatus reads function definition information defined for each particular machine type, processes constraints among functions of the printer, and generates constraint information. Based on the constraint information, the information processing apparatus reads necessary terms from a term list which is managed, and automatically generates a message by combining the terms. By this function, it is possible to express constraint information not as a mere list but as a logical structure including information of AND, OR, NOT and so forth. Thus, it is possible to display a message of complicated conditions of constraints. The above-mentioned object of embodiments of the present invention can be achieved by providing an information processing apparatus, a method of operating the apparatus and a computer readable information recording medium storing a program for performing the method according to embodiments of the present invention.

According to an embodiment of the present invention, an information processing apparatus has a display part configured to receive an input from a user and display a message to the user; a constraint processing part configured to process constraints among functions of a printer based on the input which the display part has received, and to generate constraint information; and a message generating part configured to manage a plurality of terms in a form of a term list, and to combine terms of the plurality of terms to generate the message to be displayed by the display part based on the constraint information generated by the constraint processing part.

This information processing apparatus further has a constraint definition information storing part configured to store constraint definition information describing definitions of the constraints based on a type and specification of the printer; and a term information storing part configured to store the plurality of terms. The constraint processing part reads the constraint definition information, and generates the constraint information based on contents of a change in a setting of the printer function received by the display part. The message generating part reads terms in the plurality of terms and combines these terms to generate the message based on the constraint information.

The constraint information includes identification information for identifying each function and a value which each function may have, information concerning a structure of conditions in which each function and the value which the each function may have are subject to constraint, and information concerning whether the conditions which are elements of the structure are currently valid. The constraint information may be expanded into a tree structure, and as elements of the tree structure, conditional expressions for determining whether constraints are true, and information concerning whether the conditions as the elements are currently valid, are included.

The message generating part may generate, as the message only information for a function being currently and actually subject to constraint, and the display part displays only information for a function being currently and actually being subject to constraint.

Also, the message generating part may generate as the message first information for the function being currently and actually subject to constraint and second information, other than the first information, for the function possibly being subject to constraint, and the display part displays the first information and the second information in such a manner that the first information and the second information are identified therebetween.

Further, the message generating part switches term information to use according to area information.

According to another embodiment of the present invention, a method of operating an information processing apparatus which has a function of displaying current constraint information, has the steps of a) receiving an input from a user; b) processing constraints among printer functions based on the input, and generating constraint information; c) reading terms from a term information storing part and combining the terms to generate a message based on the constraint information; and d) displaying the message as the current constraint information.

According to yet another embodiment of the present invention, a computer readable information recording medium storing a program which, when executed by one or more processors of an information processing apparatus which has a function of displaying current constraint information, carries out the steps of a) receiving an input from a user; b) processing constraints among functions of a printer based on the input, and generating constraint information; c) reading terms from a term information storing part and combining the terms to generate a message based on the constraint information; and d) displaying the message as the current constraint information.

According to the embodiments of the present invention, constraint information can be expressed not merely as a list but as such a message that, even when the message expresses complicated conditions coupled by logical operators such as AND, OR, NOT and so forth, the message can be exactly expressed. Further, in this method, messages should not necessarily be prepared for respective particular machine types. Thus, a required load can be reduced, and possible errors therein can be effectively avoided.

Further, because the constraint information and the term list are managed separately, a language of messages can be easily switched to correspond to each of respective countries. Thus, the information processing apparatus in the embodiment of the present invention can be easily adapted to each country.

A system environment of an information processing apparatus in an embodiment of the present invention will now be described. FIG. 1 shows a personal computer 11 connected to a communication network 10 as one embodiment of the present invention. Printers 12, 13 are also connected to the communication network 10, as shown.

The communication network 10 is a local area network (LAN) such as an intranet, or the Internet. As will be described later with reference to FIG. 17, the personal computer 11 has: memories 112, 113 and a hard disk drive 114 for storing various sorts of software, data and so forth; a CPU 111 starting up the software and executing various sorts of processing; an input unit 118 for a user to input information; and a display unit 119 for displaying information to the user. The personal computer 11 functions as a print server, monitors states of the printers 12, 13, and responds to finishes of previous print jobs of the printers 12, 13, to transmit new print data thereto in an order in which they are previously spooled. The personal computer 11 transmits the print data to the printers 12, 13, with the use of corresponding internet protocol (IP) addresses as well as communication protocols such as hypertext transfer protocol (HTTP) or file transfer protocol (FTP).

The printers 12, 13 are, for example, laser printers, each of which has a paper feeding unit, a photosensitive drum, an electricity charging unit, toner, an exposure unit, a transfer belt, a transfer unit, a fixing unit, and other parts. The printer 12 or 13 prints out print data transmitted by the personal computer 11 to a transfer paper sheet. The printer 12 or 13 also has optional functions, for example, a sorting function, a stapling function, a punching function, a booklet printing function and other functions.

A user uses the perusal computer 11, and changes various settings for the optional functions of each printer 12 or 13, or carries out a new setting therefor. The personal computer 11 receives such an input from the user, and carries out constraint processing according to the contents of the input. Then, if the personal computer 11 has determined that a function is currently unavailable as a result of the constraint processing, the personal computer 11 displays a message to the user showing a current constraint state of the printer 12 or 13, i.e., a reason why the function is thus currently unavailable. Software to achieve this operation will now be described with reference to FIG. 2.

FIG. 2 illustrates a software configuration of the personal computer 11. As shown in FIG. 2, (a), the personal computer 11 includes application software 20 started up by a user, to be used to create a document or such, a printer driver 21 called by an operating system (OS) when the user uses a printing function from the application software 20, and a communication part 22 transmitting corresponding print data to a controller of the printer 12 or 13 after converting the data into a page description language (PDL) which the controller of the printer 12 or 13 can understand.

The printer driver 21 shown in FIG. 2, (a), includes a UI driver 30 for a user to be able to manage various optional functions of the printer 12 or 13, and a graphic driver 31 used for image processing, as shown in FIG. 2, (b). The UI driver 30 shown in FIG. 2(*b*), includes, as shown in FIG. 2(*c*), a display part 40, a constraint managing part 41, a constraint definition information storing part 42, a constraint information storing part 43, a term managing part 44 and a term information storing part 45.

The display part 40 submits to a user a current setting state of the printer driver 21. Specifically, the display part 40 uses the above-mentioned display unit 119 such as a CRT or a liquid crystal display unit, to display the current state of the printer driver 21, and thus, submit it to the user. Further, the display part 40 receives an input from the user. The input from the user may include, for example, an instruction for changing various settings of the printer 12 or 13, a request for creating a message or such.

The constraint managing part 41 receives an instruction to change a setting, which the display part 40 has received from the user as mentioned above, for example. Then, the constraint managing part 41 carries out corresponding constraint processing. Thus, the managing part 41 carries out such control that mutually exclusive functions, i.e., a right-edge stapling function and a booklet printing function, mentioned above, for example, are prevented from being set by a user at the same time.

The constraint definition information storing part 42 stores a file which describes definitions of constraints based on a machine type and/or a specification of the printer. In order to prepare for a plurality of machine types and specifications of printers, a plurality of files may be stored by the constraint definition information storing part 42. The constraint definition information storing part 42 may detect a machine type of the printer, and download the above-mentioned file(s) corresponding to the detected machine type from the corresponding printer body, a public server or such, to store the same.

The constraint information storing part 43 stores a current constraint state as constraint information based on the above-mentioned constraint definition information and the contents of the above-mentioned instruction to change a setting input from the user. It is noted that, the constraint managing part 41 may read the constraint definition information stored by the constraint definition information storing part 42 to generate the constraint information, and store the same in the constraint information storing part 43, in order to update it.

The term managing part 44 generates a message which the display part 40 displays on the display unit 119. The term managing part 44 reads the constraint information stored by the constraint information storing part 43, reads necessary terms from the term information storing part 45, and combines the read terms to generate the message. The term information storing part 45 can store the terms to be used for generating messages which the display part 40 displays on the display unit 119, in association with corresponding identifiers and dates. The same as the constraint definition information mentioned above, the term information storing part 45 may store terms as a file describing the terms. Further, the term information storing part 45 may detect the machine type of the printer, and download the above-mentioned file corresponding to the detected machine type from the corresponding printer body, a public server or such, to store the same.

With reference to FIG. 3 showing a sequence diagram, the above-mentioned process of changing a setting and the process of displaying the constraint information will be described in detail. First, the process of changing a setting will be described. The user inputs an instruction for changing a setting of the printer 12 or 13 to the display part 40. Actually, the user inputs the instruction with the use of the input unit 118 such as a keyboard or a mouse, with seeing a screen of the display unit 119 of the personal computer 11. The display part 40 receives the instruction to change a setting, and notifies the constraint managing part 41 of the contents of the above-mentioned instruction to change a setting. The constraint managing part 41 reads the file stored by the constraint definition information storing part 42, generates current constraint information based on the above-mentioned contents of the instruction to change a setting, stores the same in the constraint information storing part 43, and thus, updates the information of the constraint information storing part 43.

The display part 40 reads the current constraint information stored by the constraint information storing part 43, and updates a state of a GUI (to be displayed on the display unit 119) to reflect the above-mentioned current constraint information. Thereby, the user can recognize the constraint information which reflects the instruction to change a setting the user has thus input as mentioned above.

Next, the process of displaying constraint information will be described. The user requests the display part 40 to display constraint information. Actually, the user inputs the request with the use of the input unit 118 while seeing the screen of the display unit 119 of the personal computer 11. The display part 40 responds to the request, by requesting the term managing part 44 to create a message. The term managing part responds to the request, then reads the current constraint information stored by the constraint information storing part 43 to obtain necessary information for creating a message. Further, the term managing part 44 reads the term information stored by the term information storing part 45, and obtains terms in association with a corresponding function name. The term managing part 44, for example, combines the thus-obtained information and terms, to generate a message. The thus-created message is then returned to the display part 40. The display part 40 displays the thus-returned message on the display unit 119 as the constraint information.

The constraint definition information may be, as shown in FIG. 4, information described by text. FIG. 4 shows information described by XML (eXtensible Markup Language) as an example. Further, the language of the constraint definition information may be, instead, information described by YAML (YAML Ain't MarkupLanguage) or JSON (Java® Script Object Notation), or described in an INI file.

In FIG. 4, a description is made assuming that a function 'functionA' is provided. In the description of FIG. 4, a function tag shown as '<function . . . >' is used to describe a constraint specification of the corresponding function. An 'id' attribute included in the function tag represents an identification of the function. In the example of FIG. 4, the function has an identifier of the function 'functionA' (see A1 of FIG. 4). A 'type' attribute represents a type of the function. In this example, the type of the function functionA is of 'enum', i.e., an enumeration type (see A2 of FIG. 4). As other types, a 'numeral type', a 'character string type', and so forth may be cited. A 'default' attribute represents a default value of the function. In this example, the function functionA has a default value of 'valueA' (see A3 of FIG. 4).

The function tag includes a single constraints tag (shown as '<constraints>' in FIG. 4) and a plurality of value tags (shown as '<value . . . >' in FIG. 4), as child elements. It is noted that, when the 'type' attribute of the function tag is 'enum', the value tags described as the child elements represent options which the function may have.

The value tag describes a constraint specification for a certain value. The 'id' attribute included in the value tag represents an identifier of the value. In the example of FIG. 4, the function 'functionA' may have a 'valueA1' or a 'valueA2' as optional values (see V1, V2 of FIG. 4). The value tag includes a single constraints tag as a child element.

The constraints tag indicates a list of constraints which the corresponding function or the corresponding value is subject to. The constraints tag includes a plurality of constraint tags (shown as '<constraint>' in FIG. 4) as child elements.

When one or more constraints corresponding to the respective constraint tags are true among the constraint tags which the constraints tag includes, the function which is the parent element of the constraints tag is unavailable.

The constraint tag indicates one constraint which the corresponding function or the value is subject to. The constraint tag includes a plurality of condition tags (shown as '<condition>' in FIG. 4) as child elements. When all the condition tags which the constraint tag includes are true, it is determined that the constraint of the constraint tag is true.

The condition tag indicates a corresponding condition, and has a conditional expression as an element. The conditional expression is described in the following format (see C1 through C5 of FIG. 4, for example):

'functionID. operator. valueID'

The 'operator' which is an operator of the conditional expression may be any one of the following ones:

'equal':
The conditional expression is true when a value of 'functionID' is equal to a value of 'valueID'.

'not_equal':
The conditional expression is true when a value of 'functionID' is different from a value of 'valueID'.

'more_than':
The conditional expression is true when a value of 'functionID' is larger than a value of 'valueID'.

'less_than':
The conditional expression is true when a value of 'functionID' is smaller than a value of 'valueID'.

For example, in FIG. 4, the conditional expression C1, '<condition>funcdtionB.not_equal.valueB1</condition>' is such that, when a value of the function 'functionB' is different from a value of 'valueB1', the conditional expression is true.

Next, FIG. 5 shows one example of constraint information. It is noted that, FIG. 5 shows constraint information concerning the function 'functionA', while constraint information concerning the value 'valueA1' and the value 'valueA2' is omitted. Specifically, conditions C1, C2, C3 and C4 shown in FIG. 5 correspond to conditions C1, C2, C3 and C4 shown in FIG. 4, respectively. Further, in FIG. 5, constraint definition information is expanded to have a tree structure as shown. Each condition S1, S2, S3 has, as its elements, the identifiers of the 'function name' and the 'value', and the above-mentioned operator of the conditional expression (indicated as 'condition' in FIG. 5). Further, each condition C1, C2, C3, C4 has, as its element, a 'state'. This element 'state' shows whether the corresponding condition is valid (true) or invalid (false). For example, the value of the function 'functionB' is actually set in a value other than 'valueB1', thus, the corresponding conditional expression is true, and as a result, the state of the condition C1 is 'valid', as shown in FIG. 5. Similarly, the value of the function 'functionC' is actually set in a value of 'valueC2', thus, the corresponding conditional expression is true, and as a result, the state of the condition C2 is 'valid', as shown in FIG. 5. Similarly, the value of the function 'functionD' is actually set in a value of 'valueD2', thus, the corresponding conditional expression is true, and as a result, the state of the condition C3 is 'valid', as shown in FIG. 5. Similarly, the value of the function 'functionE' is actually set in a value other than 'valueE2', thus, in this case, the corresponding conditional expression is false, and as a result, the state of the condition C4 is 'invalid', as shown in FIG. 5. The state of FIG. 5 means that the first constraint S1 including the conditions C1, C2 as its child elements is valid (true) since the corresponding conditions C1, C2 are both valid (true) as mentioned above. As a result, the corresponding constraint S1 is valid. Similarly, the second constraint S2 including the condition C3 is valid (true) since the corresponding condition C3 is valid (true) as mentioned above. As a result, the corresponding constraint S2 is also valid. Similarly, the third constraint S3 including the condition C4 is invalid (false) since the corresponding condition is invalid (false) as mentioned above. As a result, the corresponding constraint S3 is invalid. Consequently, since the two constraints S1 and S2 of the three constraints S1, S2 and S3 are valid (true), the function functionA is subject to constraint. That is, in this example of FIG. 5, the reason why the function functionA is subject to constraint is the conditions C1, C2 and C3 are all valid (true) as shown. This is the reason why the corresponding functions, i.e., functionB, functionC and functionD are displayed in a message shown in FIGS. 8A, 8B, which will be described later.

It is noted that the constraint information is at all times updated to the latest state.

Figure 6B:
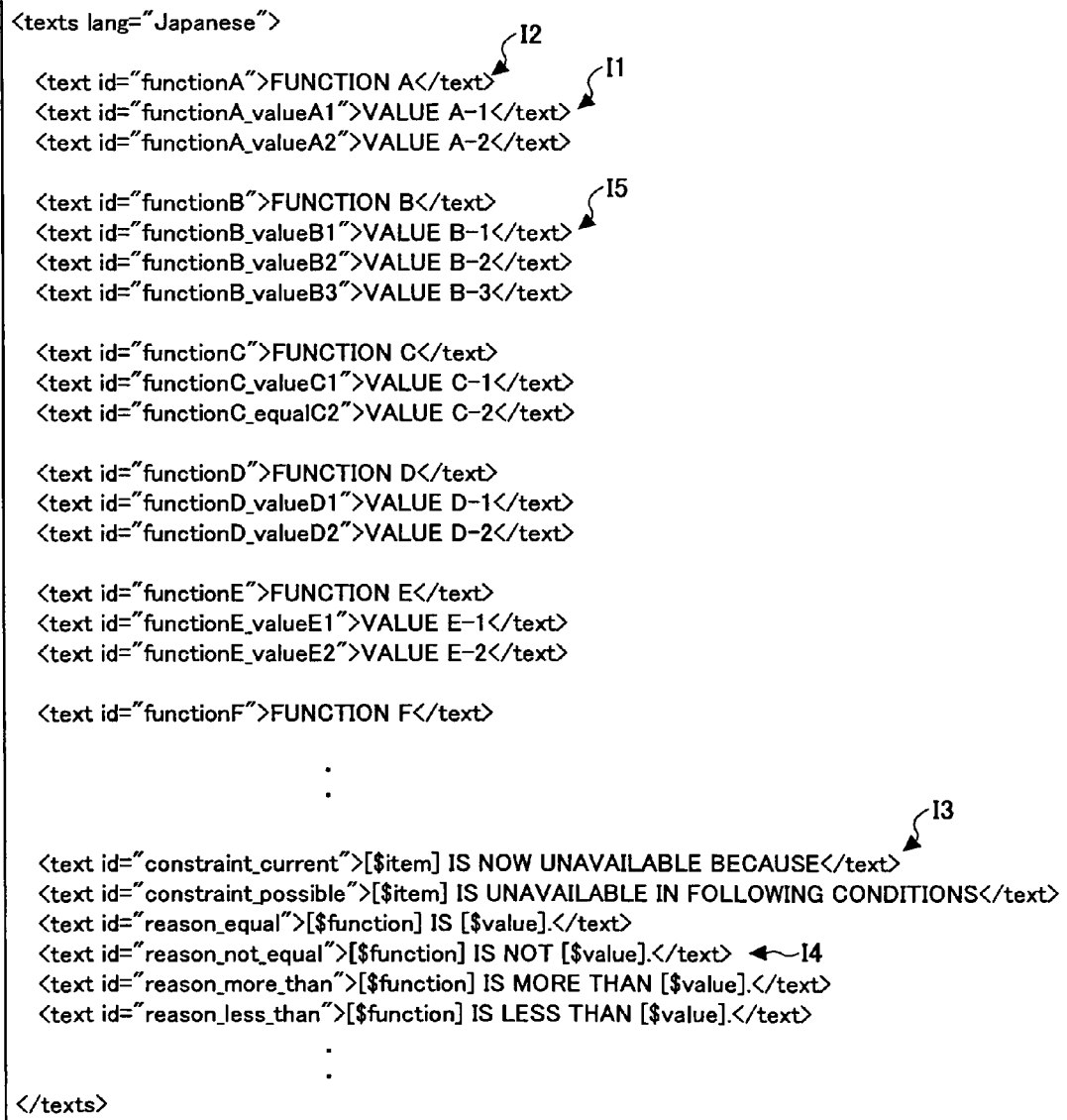
FIG. 6B shows an English translation of the term information shown in FIG. 6A.

FIG. 6A shows an example in which term information is described by text. FIG. 6B shows an English translation of FIG. 6A. In FIG. 6A, a texts tag (shown as '<texts . . . >' in FIG. 6A) is used to describe a list of terms in a certain language. A language attribute (shown as 'lang' in FIG. 6A) indicates a specific language. In the example of FIG. 6A, 'lang="Japanese"' in the texts tag indicates the Japanese language. The texts tag has a plurality of text tags (shown as <text . . . > in FIG. 6A) as child elements.

The text tag indicates one term. An 'id' attribute (shown as 'id' in FIG. 6A) included in the text tag indicates an identifier of the term. For the function which is defined as the constraint definition information, the same identifier may be used. That is, in the example of FIG. 6A, the 'functionA' is used as 'id' for the terms for the function 'functionA' (i.e., in FIG. 6A, see I2, 'id="functionA"' in the text tag), for example. An identifier of the value of the function is described in a form of 'functionID_valueID' with a predetermined separator, i.e., '_' in this example. For example, in FIG. 6A, the identifier of the value 'value' is described as 'fundtionA_valueA1', as shown (see I1 of FIG. 6A). Thus, the identifier which is uniquely linked from the constraint definition information can be used. It is noted that the term managing part 44 can generate the identifier of the term by combining the function name and the value with the use of the separator '_' in this example inserted therebetween. The text tag includes a term designated by a corresponding identifier as an element. For example, a term 'VALUE A-1' is an element of the text tag designated by the identifier 'fundtionA_valueA1' (see I1 of FIG. 6B).

Figure 7:
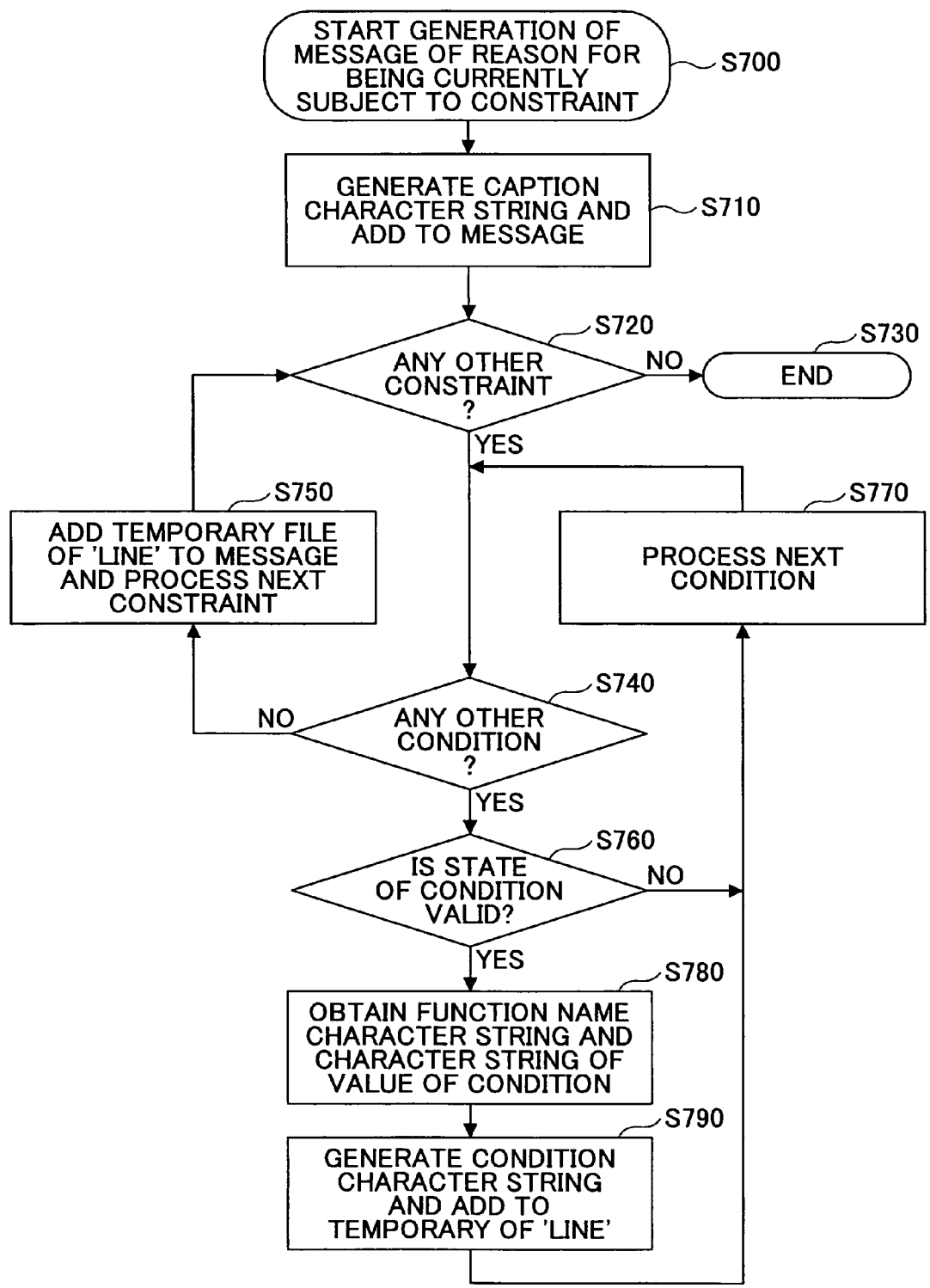
FIG. 7 shows one embodiment of an operation of generating a message.

FIG. 7 shows a flow of operation of creating a message for displaying the constraint information. A message is created by tracing the tree structure shown in FIG. 5. In response to the user's request, creation of a message is started (Step S700). First, in Step S710, a caption character string is generated as a message. The caption character string means a character string for configuring a short description. For example, in FIG. 5, 'ITEM' at the top of the tree structure has a value 'NONE'. In this case, a character string 'functionA' which is the function name is obtained. Then, from the term information shown in FIG. 6B, with the use of the identifier of the function name of 'functionA', a character string is obtained.

Actually, a character string 'FUNCTION A' which is the element of the text tag identified by the above-mentioned function name 'functionA' is obtained (see I2 of FIG. 6B). Next, a term '[$ item] IS NOW UNAVAILABLE BECAUSE:' identified by an identifier 'constraint_current' (see I3 of FIG. 6B) is obtained. Then, '$ item' therein is replaced by the term 'FUNCTION A' obtained as mentioned above. Thus, a caption character string is obtained as '[FUNCTION A] IS NOW UNAVAILABLE BECAUSE:'. It is noted that, if the value of the above-mentioned ITEM is not NONE, the identifier of the function name and the identifier of the value are combined with the separator '_' inserted therebetween, and thus, an identifier is generated. In this case, if the value is actually the above-mentioned valueA1, the function name 'functionA' and the value 'valueA1' is combined to obtain 'functionA_valueA1'. In this case, from the term information shown in FIG. 6B, the term 'VALUE A-1' is obtained from the text tag identified by the above-mentioned identifier 'functionA_valueA1' (see I1 of FIG. 6B).

In Step S720, it is determined whether any constraints are left unprocessed. If there are no constraints left unprocessed, Step S730 is carried out. If there are any constraints left unprocessed, Step S740 is carried out, and then, it is determined whether any conditions are left unprocessed. If there are no conditions left unprocessed, Step S750 is carried out, and a character string temporarily stored in a temporary file is added to the message, and then a next constraint is processed in Step S720.

When there is any condition left unprocessed in Step S740, Step S760 is carried out. Then, it is determined whether the state of the condition is valid (see FIG. 5). When the state of the condition is invalid, no character string is created for the condition, and then, Step S770 is carried out and then, a next condition is processed. When the state of the condition is valid in Step S760, Step S780 is carried out. In this case, the identifier of the condition is combined with 'reason_', and an identifier thus obtained from the combining is used to identify a term to use. For example, when the condition is 'not_equal' which is the left end one of FIG. 5, the identifier 'not_equal' of the condition (i.e., the above-mentioned operator) is combined with 'reason_' to obtain an identifier 'reason_not_e-qual'. Then, as shown in I4 of FIG. 6B, a term '[$ function] IS NOT [$ value]' is obtained identified by this identifier 'reason_not_equal'.

Figure 8A:
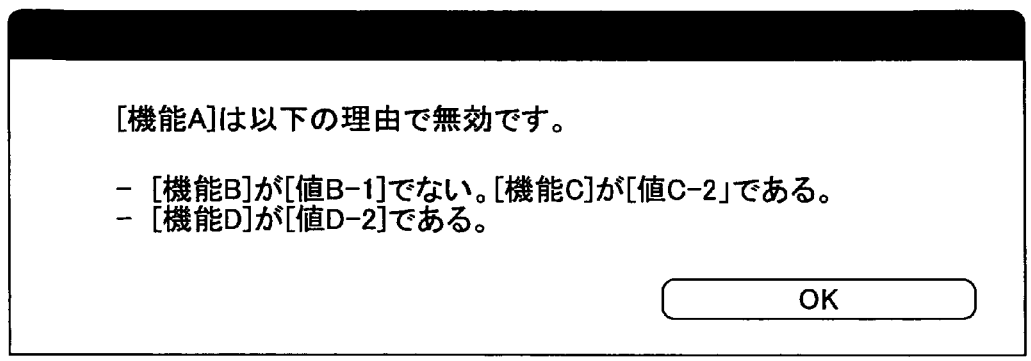
FIG. 8A shows one embodiment of a message to be displayed.
Figure 8B:
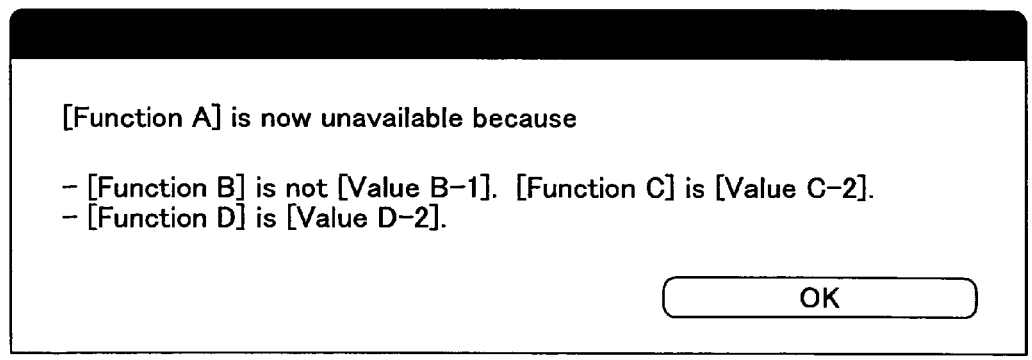
FIG. 8B shows an English translation of the message shown in FIG. 8A.

Then, in the thus-obtained term, '$ function' is replaced by a term identified by an identifier of the function name. In the above-mentioned example, the function name of the condition at the left end of FIG. 5 is 'functionB'. Therefore, '$ function' is replaced by the function name 'functionB'. Further, an identifier is generated as a result of the identifier of the function name and the identifier of the value being combined with the separator '_' inserted therebetween. In the above-mentioned example, the identifier of the condition at the left end of FIG. 5 is 'valueB1'. Therefore, 'functionB' and 'valueB1' are combined with the separator '_', and thus, an identifier 'functionB_valueB1' is obtained. Then, a term identified by the thus-obtained identifier is used to replace '$ value'. In the above-mentioned example, as shown in I5 of FIG. 6B, a term 'VALUE B-1' is obtained which is identified by the identifier 'functionB_valueB1'. As a result, a character string '[FUNCTION B] IS NOT [VALUE B-1]' is obtained. Then, in Step S790, the thus-generated character string is added to a temporary file of 'line'. Then, in Step S770, a next condition is processed in Step S740. The thus-generated message is transmitted to the display part 40, which then displays the message on the display unit 119. FIG. 8A shows one example of the message thus generated and displayed on the display unit 119. FIG. 8B shows an English translation of the message shown in FIG. 8A (the same manner holds also for FIGS. 11A, 11B, and FIGS. 12A, 12B).

According to the message shown in FIG. 8B, the actual value of the function functionB is not the value valueB1, the actual value of the function functionC is the value valueC2, and the value of the function functionC is the value valueD2. As a result, the function functionA is invalid. That is, as shown in FIG. 5, the function functionA is subject to constraint when the function functionB has not the value valueB1, the function functionC has the value valueC2 and the function functionD has the value valueD2. Thus, the actual conditions are the same as those for being subject to constraint, and, as a result, the function functionA is actually subject to constraint. In order to use the function functionA, the actual conditions should be made different from those for being subject to constraint.

For this purpose, at least any one of the above-mentioned three conditions, i.e., the value of the function functionB is not the value valueB1, the value of the function functionC is the value valueC2 and the value of the function functionD is the value of valueD2, should not be met. For example, the value of the function functionB is made equal to the value valueB1, the value of the function functionC is made different from the value valueC2 or the value of the function functionD is made different from the value valueD2. Thus, by reading the message such as that shown in FIG. 8B, the user can easily understand an actual way to make it possible to use the function A, i.e., to make the function functionA available, by thus making the conditions of being subject to constraint not be met.

Figure 9:
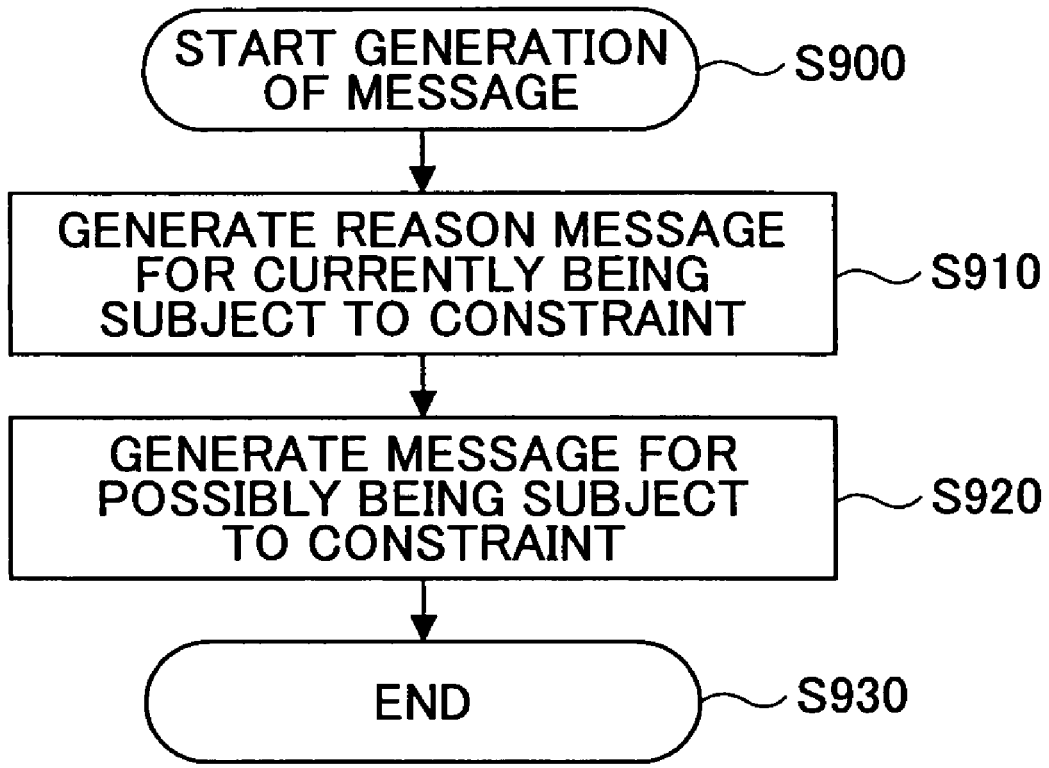
FIG. 9 shows another embodiment of an operation of generating a message.

The process of displaying the reason for currently being subject to constraint has been described. In addition to the reason for currently being subject to constraint, a message of currently not being subject to constraint but possibly being subject to constraint may also be displayed together. FIG. 9 shows a flow of processing in this case. That is, in Step S900, creation of a message is started. In Step S910, a message of currently being subject to constraint is created. In Step S920, a message of possibly being subject to constraint is created. The process is finished after these two messages have been created (Step S930).

Figure 10:
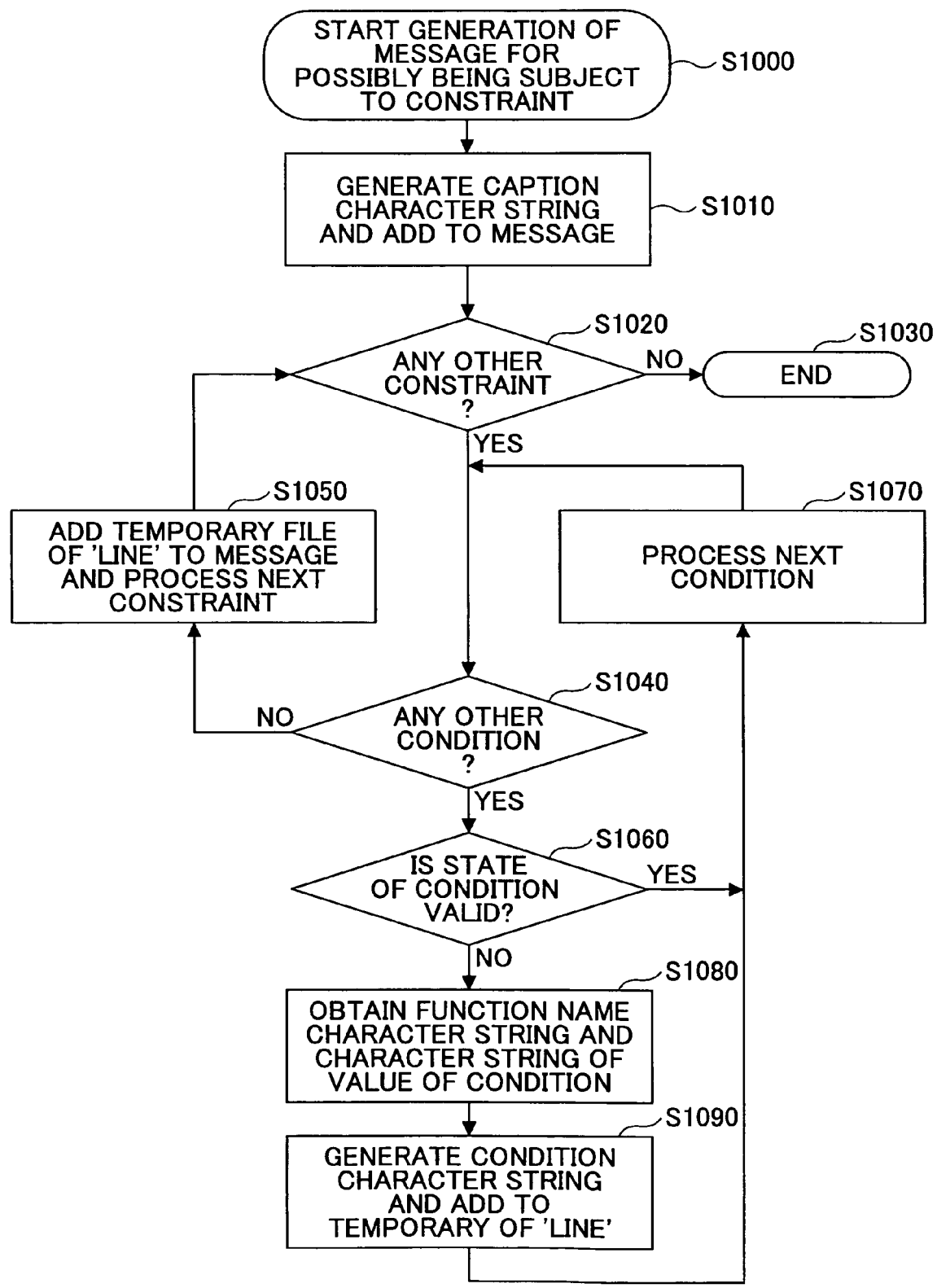
FIG. 10 illustrates a part of a flow chart shown in FIG. 9.

The process of Step S910 has been already described with reference to FIG. 7. Accordingly, the process of Step S920 will now be described with reference to FIG. 10. It is noted that, in a determination of Step S760 in the process of FIG. 7, a character string of the condition is created when a state of a condition is valid, and then, the same is added to a temporary file of 'line'. However, when the state of the condition is invalid, the character string is not created. In contrast thereto, in the process of FIG. 10, in Step S1060, a character string is not created when a state of a condition is valid. However, when the state of the condition is invalid, the character string is created. It is noted that the other steps S1000 through S1050, S1070 through S1090 are the same as the steps S700 through S750, S770 through S790, respectively, and a duplicate description will be omitted.

For example, when only the reason for actually currently being subject to constraint is displayed for 'valueA1' of 'functionF' in a case where a value of 'functionF' is more than '100' (see C5 of FIG. 4), only a message that a [Function F] is more than [100] is displayed as shown in FIGS. 11A, 11B. In contrast thereto, when the process of FIG. 9 is carried out, the other reason for possibly being subject to constraint (in an example of FIGS. 12A, 12B, '[Function B] is [Value B-2]' and '[Function B] is [Value B-3]') is also displayed in such a way that the reason for currently being subject to constraint and the reason for possibly being subject to constraint can be identified therebetween, as shown in FIGS. 12A, 12B.

Figure 12A:
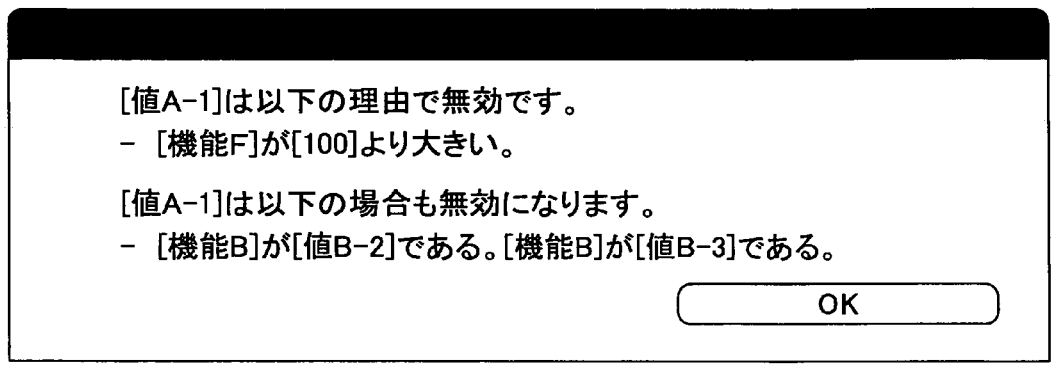
FIG. 12A shows further another embodiment of a message to be displayed.
Figure 12B:
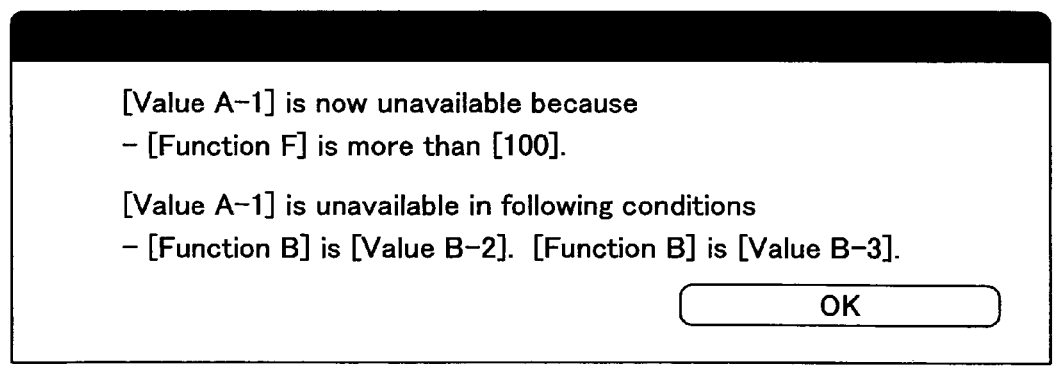
FIG. 12B shows an English translation of the message shown in FIG. 12A.

In FIGS. 12A, 12B, in addition to a message of '[Function F] is more than [100]', another message of '[Value A-1] is unavailable also in following conditions:—[Function B] is [Value B-2]. [Function B] is [Value B-3]' can also be displayed.

In the above-mentioned embodiments, terms to be displayed are in the Japanese language. The language of terms may be switched according to an area (or country) in which the system shown in FIG. 1 is actually used. For this purpose, the term information storing part 45 may store term information shown in FIG. 13. Switching of the language of terms may be carried out by the term managing part 44 based on the area (or country). For the term managing part 44, a user or a managing person may previously carry out a setting for the language of terms. Then, the term managing part 44 reads the setting, generates a message with the use of terms of the language of the setting, and transmits the message to the display part 40.

Figures 14, 15:
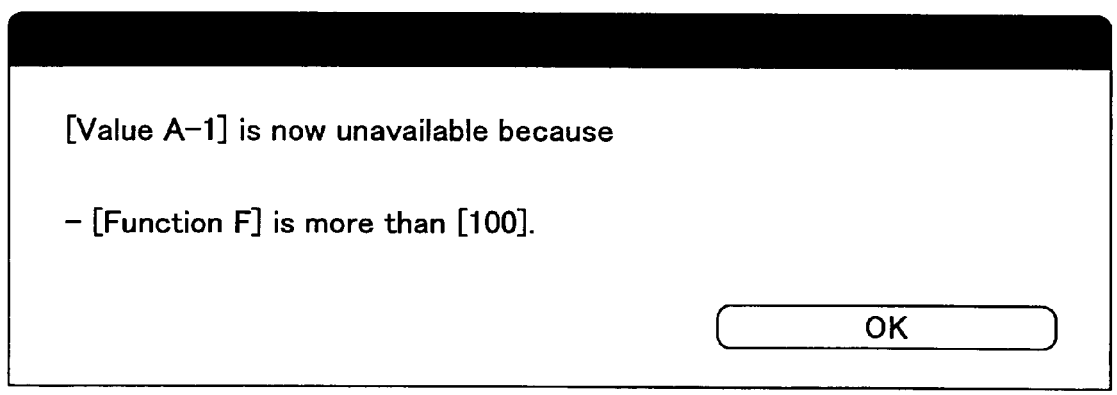
FIG. 14 shows a relationship between area information and corresponding term information (i.e., a language of terms) to be used.
FIG. 15 shows one embodiment of a message switched for a particular area.

In this case, a predetermined table shown in FIG. 14 may be prepared, and a user is allowed to select any of areas (or countries) listed in an area information column of the table. Then, based on the selection of the user, the term managing part 44 generates a message with the use of terms of the thus-determined language, and transmits the message to the display part 40.

Figure 16:
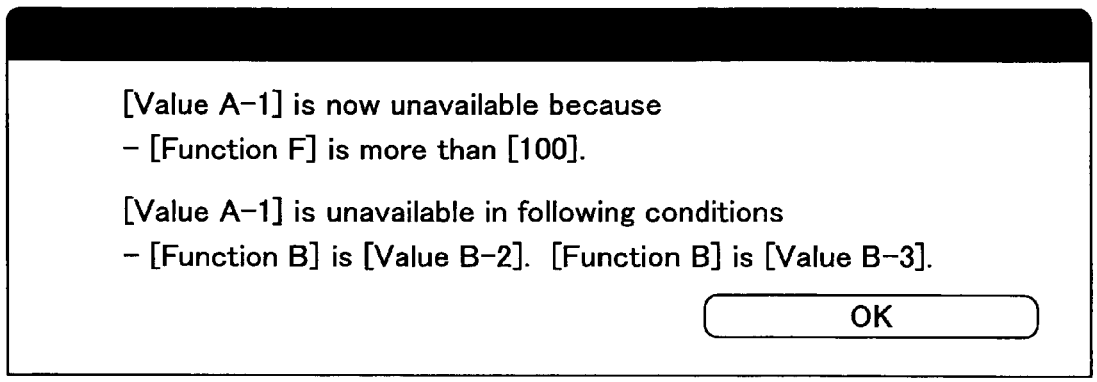
FIG. 16 shows another embodiment of a message switched for a particular area.

Then, when a language to use is thus determined as 'English' in a case where the value of 'functionF' is more than '100', and a message concerning 'valueA1' of 'functionA' is displayed, the message is created in English, and thus, instead of the displays shown in FIGS. 11A, 12A, messages of FIGS. 15, 16 are displayed.

In the above-mentioned embodiments, the description has been made such that the respective parts included in the UI driver 30 (see FIG. 2) generate constraint information, and generate messages. The CPU 111 (see FIG. 17) may execute the UI driver 30 including these respective parts, and thereby, the CPU 111 may function as the display part, the constraint processing part and the message generating part. Thus, the CPU 111 carries out the above-mentioned processing described with reference to FIGS. 3 through 16.

This UI driver 30 may be stored in a computer readable information recording medium, and thus, may be provided in a form of the computer readable information recording medium. As the computer readable information recording medium, a flexible disk, a CD-ROM, a DVD, a memory card or such, may be cited.

Figure 17:
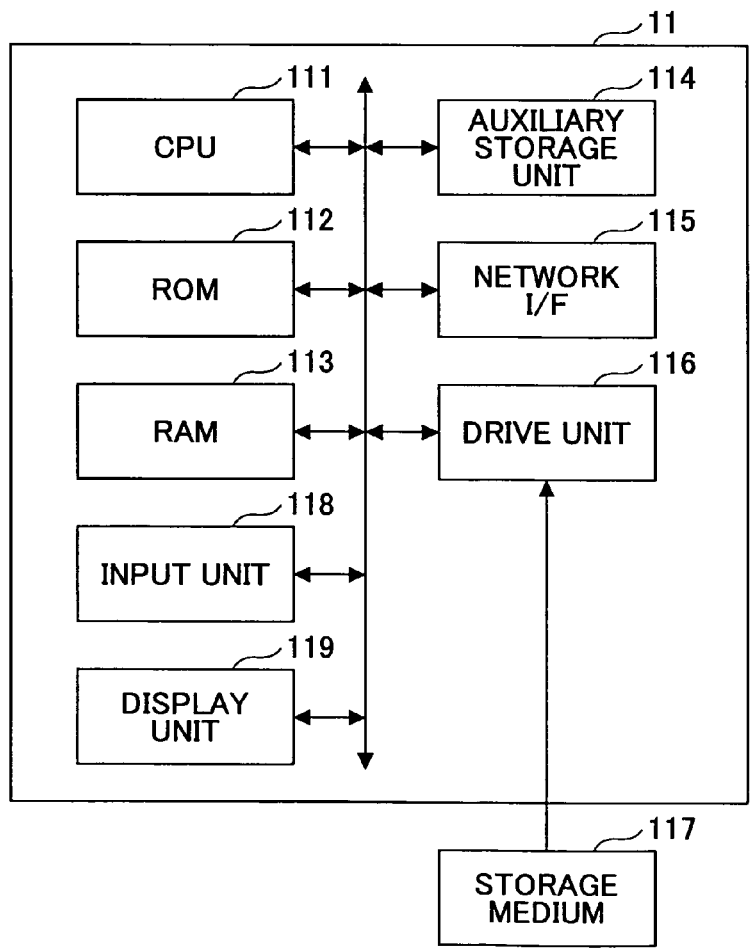
FIG. 17 shows a structural block diagram of the personal computer shown in FIG. 1.

Next, referring to FIG. 17, a detailed description of the personal computer 11 will be made. The personal computer 11 includes a central processing unit (CPU) 111, a read-only memory (ROM) 112, a random-access memory (RAM) 113, an auxiliary storage unit 114, a network interface (I/F) 115, a drive unit 116, an input unit 118 and a display unit 119.

The CPU 111 is a controller unit controlling the personal computer 11 as a whole. The CPU 111 controls communication, data acquisition, and data compilation by executing various control programs and application programs stored in the ROM 112 or the auxiliary storage unit 114.

The ROM 112 is a memory unit primarily storing a control program. The RAM 113 is, for example, a cache memory for the CPU 111, which is a memory unit configured for temporary data storage. The auxiliary storage unit 214 is a memory unit storing various application programs and data.

The network I/F 115 is an interface for connecting the personal computer 11 to the network 10 shown in FIG. 1. The drive unit 116 is a unit for reading out a computer readable storage medium 117, such as a CD-ROM, storing the program such as the above-mentioned UI driver including these respective parts, and thereby, the CPU 111 may function as the above-mentioned display part, constraint processing part and message generating part, as mentioned above. In addition, the input unit 118, such as a keyboard or a mouse, and the display unit 119, such as a liquid crystal display device or a cathode-ray tube (CRT), are provided in the personal computer 11 as shown. In this way, data input from a user can be received and operational results can be displayed.

The present invention is not limited to the specifically disclosed embodiments, and variations and modifications may be made without departing from the scope of the present invention.

The present application is based on Japanese priority application No. 2007-109532 filed on Apr. 18, 2007, the entire contents of which are hereby incorporated herein by reference.

What is claimed is:

1. An information processing apparatus comprising:
a processor;
a display part configured on the processor to receive an input from a user and display a message to the user;
a constraint processing part configured to process constraints among functions of a printer based on the input which the display part has received, and generate constraint information; and
a message generating part configured to manage a plurality of terms in a form of a term list, and combine terms of the plurality of terms to generate the message to be displayed by said display part based on the constraint information generated by said constraint processing part;
a constraint definition information storing part configured to store constraint definition information describing definitions of the constraints based on a type and specification of the printer; and
a term information storing part configured to store the plurality of terms;

wherein said constraint processing part reads the constraint definition information, and generates the constraint information based on contents of a change in a setting of the function of the printer received by the display part; and said message generating part reads terms of the plurality of terms and combine the terms to generate the message based on the constraint information;

wherein said constraint information comprises identification information for identifying each function and a value which each function may have, information concerning a structure of conditions in which each function and the value which the each function have are subject to constraint, and information concerning whether the conditions which are elements of the structure are currently valid.

2. The information processing apparatus as claimed in claim 1, wherein:

said message generating part generates, as the message, only information for the function being currently and actually subject to constraint, and said display part displays only information for being currently and actually subject to constraint.

3. The information processing apparatus as claimed in claim 1, wherein:

said message generating part generates, as the message, first information for the function being currently and actually subject to constraint and second information, other than said first information, for the function possibly being subject to constraint, and the display part displays the first information and the second information in such a manner that the first information and the second information are identified there between.

4. The information processing apparatus as claimed in claim 1, wherein:

said message generating part switches term information to use according to area information.

5. The information processing apparatus as claimed in claim 4, wherein:

said message generating part generates, as the message, only information for the function being currently and actually subject to constraint, and said display part displays only information for being currently and actually subject to constraint.

6. The information processing apparatus as claimed in claim 4, wherein:

said message generating part generates, as the message, first information for the function being currently and actually subject to constraint and second information, other than said first information, for the function possibly being subject to constraint, and the display part displays the first information and the second information in such a manner that the first information and the second information are identified therebetween.

7. A method of operating an information processing apparatus which has a function of displaying current constraint information, comprising the steps of:

a) receiving an input from a user and displaying a message to the user;

b) processing constraints among functions of a printer based on the input, and generating constraint information;

(c) processing constraints among functions of a printer based on the input which a display part has received, and generating constraint information; and (d) managing a plurality of terms in a form of a term list, and combining terms of the plurality of terms to generate the message to be displayed by said display part based on the constraint information generated by said constraint processing part;

(e) storing in a storing part constraint definition information describing definitions of the constraints based on a type and specification of the printer;

(f) storing the plurality of terms in the storing part, (g) reading the constraint definition information, and generating the constraint information based on contents of a change in a setting of the function of the printer received by the display part, wherein said message generating part reads terms of the plurality of terms and combines the terms to generate the message based on the constraint information;

wherein said constraint information comprises identification information for identifying each function and a value which each function may have, information concerning a structure of conditions in which each function and the value which the each function have are subject to constraint, and information concerning whether the conditions which are elements of the structure are currently valid.

8. A computer readable storage information recording medium storing a program which, when executed by one or more processors of an information processing apparatus which has a function of displaying current constraint information, carries out steps of:

a) receiving an input from a user and displaying a message to the user;

b) processing constraints among functions of a printer based on the input, and generating constraint information;

(c) processing constraints among functions of a printer based on the input which the display part has received, and generating constraint information; and (d) managing a plurality of terms in a form of a term list, and combining terms of the plurality of terms to generate the message to be displayed by said display part based on the constraint information generated by said constraint processing part;

(e) storing in a storing part constraint definition information describing definitions of the constraints based on a type and specification of the printer;

(f) storing the plurality of terms in a term information storing part;

(g) reading the constraint definition information, and generating the constraint information based on contents of a change in a setting of the function of the printer received by the display part, wherein said message generating part reads terms of the plurality of terms and combines the terms to generate the message based on the constraint information; and wherein said constraint information comprises identification information for identifying each function and a value which each function may have, information concerning a structure of conditions in which each function and the value which the each function have are subject to constraint, and information concerning whether the conditions which are elements of the structure are currently valid.

* * * * *